(12) United States Patent
Palanchon et al.

(10) Patent No.: US 8,291,892 B2
(45) Date of Patent: Oct. 23, 2012

(54) HEAT EXCHANGER WITH CAST HOUSING AND METHOD OF MAKING THE SAME

(75) Inventors: Herve Palanchon, Leverkusen (DE); Hans Katzmaier, Beimerstetten (DE); Bruno Chapoutol, Acheres (FR)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 13/372,797

(22) Filed: Feb. 14, 2012

(65) Prior Publication Data

US 2012/0138279 A1 Jun. 7, 2012

Related U.S. Application Data

(63) Continuation of application No. 12/400,353, filed on Mar. 9, 2009, now abandoned.

(51) Int. Cl.
*F02M 25/07* (2006.01)
*F02B 47/08* (2006.01)
*F28D 1/03* (2006.01)
*F28F 3/10* (2006.01)
*B23P 15/26* (2006.01)

(52) U.S. Cl. ............... 123/568.12; 165/153; 165/166; 165/170; 29/890.03; 29/890.053; 29/890.054

(58) Field of Classification Search ............ 123/568.12; 60/605.2; 165/51, 139, 152, 153, 157, 161, 165/164–166, 168, 170, 173; 29/890.03, 29/890.039, 890.043, 890.053, 890.054

See application file for complete search history.

(56) References Cited

U.S. PATENT DOCUMENTS

| 2,843,367 | A | * | 7/1958 | Bogus et al. | 165/139 |
| 3,185,210 | A |   | 5/1965 | Kuhne et al. | |
| 5,257,662 | A | * | 11/1993 | Osborn | 165/173 |
| 5,373,896 | A | * | 12/1994 | Osborn | 165/173 |
| 5,538,079 | A | * | 7/1996 | Pawlick | 165/153 |
| 5,785,117 | A | * | 7/1998 | Grinbergs | 165/166 |
| 6,173,701 | B1 |   | 1/2001 | Azuma | |
| 6,257,483 | B1 |   | 7/2001 | Inaba | |
| 6,460,520 | B1 |   | 10/2002 | Challis | |
| 6,516,874 | B2 | * | 2/2003 | Mathur et al. | 165/166 |
| 6,612,293 | B2 |   | 9/2003 | Schweinzer et al. | |
| 6,802,365 | B2 | * | 10/2004 | Huguet et al. | 165/166 |
| 6,807,955 | B2 |   | 10/2004 | Leedham et al. | |
| 6,901,996 | B2 | * | 6/2005 | Gievers et al. | 165/166 |
| 6,968,832 | B1 |   | 11/2005 | Rowells | |

(Continued)

FOREIGN PATENT DOCUMENTS

JP 2001221106 A 8/2001

*Primary Examiner* — Willis R Wolfe, Jr.
(74) *Attorney, Agent, or Firm* — Marshall & Melhorn LLC

(57) ABSTRACT

A heat exchanger suitable for cooling exhaust gases and a method of making same are disclosed. The heat exchanger includes an outer casting member having first and second ends and forming a housing and a plurality of channel members forming alternating first and second flow channels for the flow of an exhaust gas through the first flow channels and coolant through the second flow channels. The channel members form a core having first and second ends, this core being mounted in the casting member. A first flange is fixedly attached to a first end of the core so as to form a sealed joint. A second flange is fixedly attached to the second end of the core so as to form another sealed joint. The first and second flanges are each coupled by fasteners to their respective ends of the casting.

20 Claims, 10 Drawing Sheets

U.S. PATENT DOCUMENTS

| | | | |
|---|---|---|---|
| 7,610,949 B2 * | 11/2009 | Palanchon | 165/166 |
| 7,810,552 B2 * | 10/2010 | Slaughter | 165/148 |
| 2002/0162651 A1 | 11/2002 | Nakagome et al. | |
| 2004/0069475 A1 | 4/2004 | Brost et al. | |
| 2006/0207245 A1 | 9/2006 | Yamaguchi et al. | |
| 2006/0231243 A1 | 10/2006 | Sugihara et al. | |
| 2007/0144500 A1 | 6/2007 | Dupree et al. | |
| 2009/0020275 A1 | 1/2009 | Neher et al. | |
| 2009/0255650 A1 * | 10/2009 | Magill et al. | 165/166 |

* cited by examiner

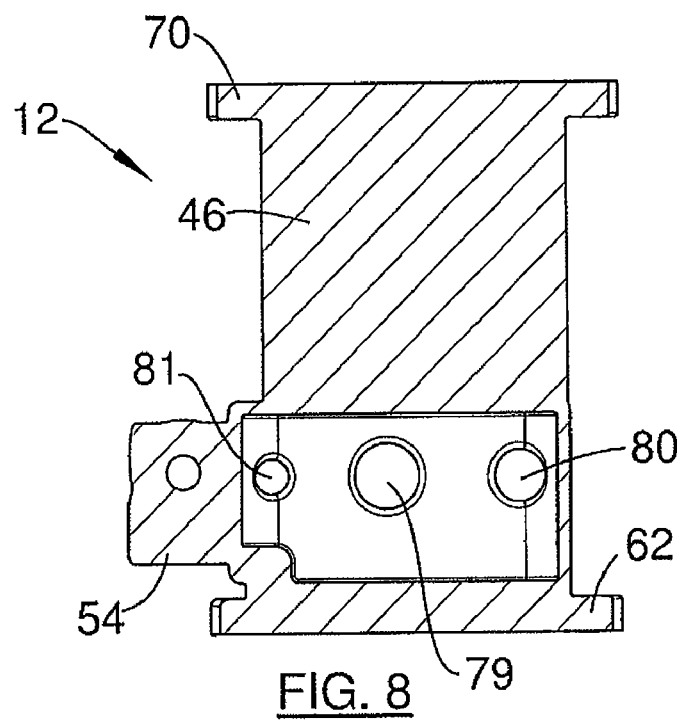
FIG. 8
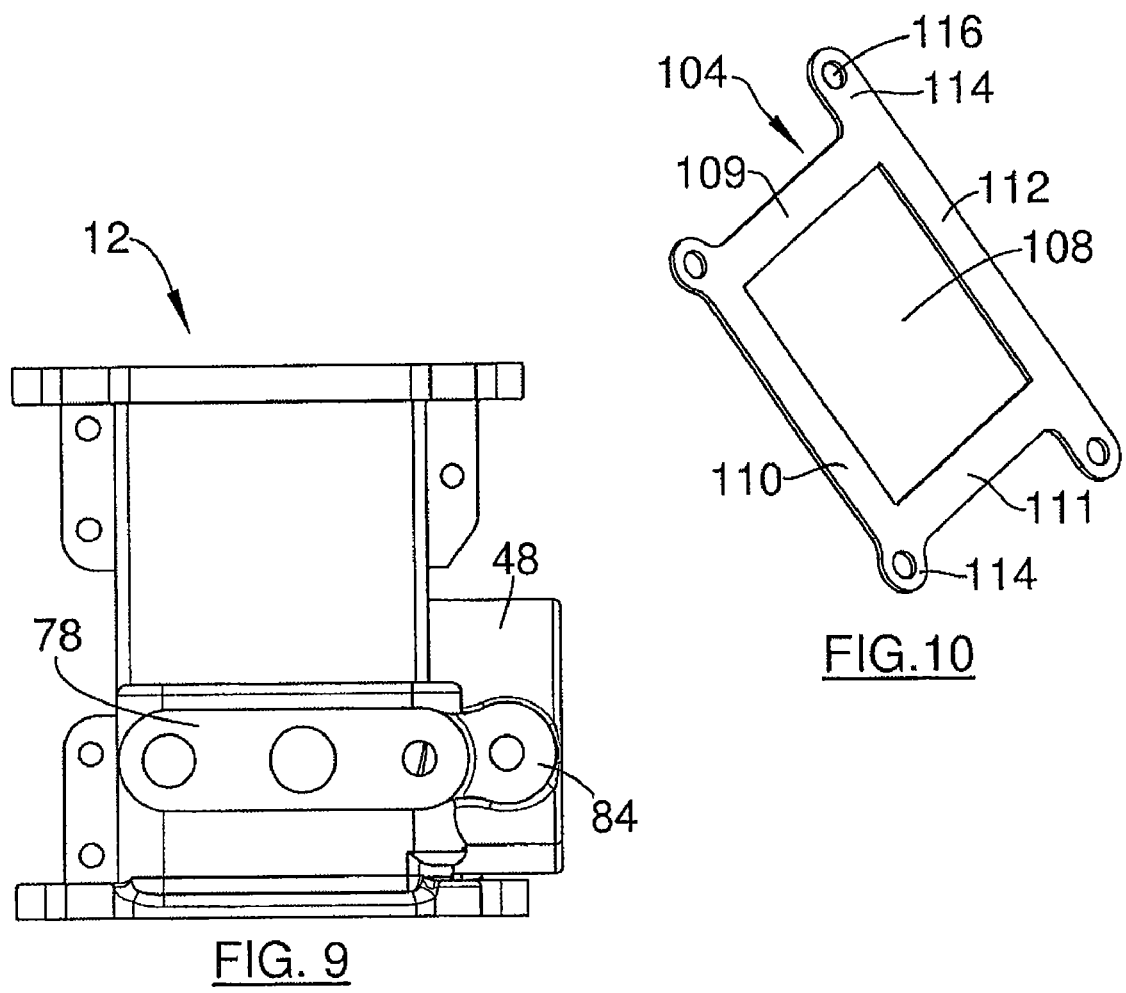
FIG. 9
FIG. 10

HEAT EXCHANGER WITH CAST HOUSING AND METHOD OF MAKING THE SAME

BACKGROUND OF THE INVENTION

This invention relates generally to heat exchangers, including exhaust gas coolers for use in vehicles and to a method of making heat exchangers.

In the vehicle industry, particularly the truck building industry, it is known to provide an EGR apparatus which re-circulates exhaust gas from a vehicle engine to reduce the generation of nitrogen oxides. The apparatus includes an EGR cooler which can cool the exhaust gas for re-circulation in order to drop the temperature of and reduce the volume of the exhaust gas which in turn lowers the combustion temperature in the engine without substantial decrease of output thereof. The effective result of such an apparatus is to reduce the generation of nitrogen oxides.

Published U.S. application No. 2006/0231243 describes an EGR cooler comprising a core made of parallel tubes which are separated from one another. A cylindrical shell surrounds the core and has plates at its opposite ends which are respectively affixed so as to close the ends of the shell. Bowl-shaped hoods are fixed to their respective plates so as to enclose the outer faces of the plates, these hoods respectively forming a central exhaust gas inlet and a central exhaust gas outlet. Mounting flanges appear to be connected to the outer ends of these hoods. Unlike the heat exchanger described herein, this known EGR cooler does not employ a cast housing forming the exterior of the cooler or heat exchanger.

A cast housing can be advantageous in certain heat exchanger applications as it can facilitate connections such as the use of connecting flanges and such housings can be manufactured at a reasonable cost, even when the volume of production is relatively low. The casting forming the exterior of the heat exchanger can in an exemplary embodiment be made of relatively low cost grey cast iron. Also the present invention enables the heat exchanger core to be mounted within a chamber of the casting by means of flanges fixedly attached to opposite ends of the core.

SUMMARY OF THE INVENTION

A heat exchanger according to one embodiment of the invention comprises an outer casting member having a first end and a second end and forming a heat exchanger housing extending between the first and second ends, and a plurality of stacked channel members defining a first set of flow channels for the flow of a first fluid through the heat exchanger. Spaces are formed between adjacent channel members so as to provide a second set of flow channels for the flow of a second fluid through the heat exchanger. The stacked channel members form a heat exchanger core having a first end and a second end and this core is mounted within the outer casting member. A first flange is fixedly attached to the first end of the heat exchanger core so as to provide a sealed joint between the first flange and the first end. A second flange is fixedly attached to the second end of the heat exchanger core so as to provide a sealed joint between the second flange and the second end. Each of the first and second flanges are adapted to be coupled by fasteners to its respective end of the outer casting member.

In an exemplary embodiment, the fasteners include bolts and the outer casting member is made of cast iron and is formed with bolt-receiving holes at both the first end and the second end. The first and second flanges are formed with bolt holes alignable with the bolt-receiving holes in the outer casting member in order that the flanges can be attached by the bolts to the outer casting member.

According to another embodiment of the invention, an exhaust gas cooler for use in a vehicle having an engine that in use emits an exhaust gas includes a cast cooler housing having a first end, an opposite second end, and a heat exchange chamber extending between the first and second ends. The cooler housing also has an inlet port for coolant and an outlet port for coolant. There is also provided a heat exchanger core having a first end and a second end, this core being mounted in the chamber of the cooler housing and including channel members defining first flow channels for the flow of the exhaust gas through the core. Second flow channels are provided between the channel members for the flow of the coolant through the core. The second flow channels alternate with the first flow channels. A first flange is fixedly attached to the first end of the heat exchanger core so as to provide a sealed joint between the first flange and the first end. A second flange is fixedly attached to the second end of the heat exchanger core so as to provide a sealed joint between the second flange and the second end. Each of the first and second flanges are adapted to be coupled by fasteners to its respective end of the cooler housing.

In an exemplary embodiment, a first seal is arranged between the first flange and the first end of the cooler housing and also a second seal can be arranged between the second flange and a second end of the cooler housing.

According to another aspect of the invention, a method of making a heat exchanger is provided, this method including providing a brazed cooler core having a first end and a second end, the core including channel members arranged one above another and defining two sets of flow channels for the flow of coolant through a first of the sets and the flow of hot gases through a second of the sets. The flow channels of the first set alternate with the flow channels of the second set. A cast cooler housing is also provided, this housing having a first end, an opposite second end, a heat exchange chamber extending between the first and second ends, and ports for flow of the coolant into and out of the chamber. A first flange member is welded on the first end of the cooler core so as to provide a sealed joint between the first flange member and the first end, and then the cooler core is inserted into the heat exchange chamber of the cooler housing through a first opening in the first end of the cooler housing so that the first flange is adjacent to the first end of the cooler housing and an end section of the cooler core projects through a second opening in the second end of the cooler housing. A second flange member is then welded to the second end of the cooler core so that a sealed joint is provided between the second flange member and the second end.

Further features and advantages of the heat exchanger, the exhaust gas cooler, and methods of making same will become apparent from the following detailed description taken in conjunction with the accompanying drawings.

BRIEF DESCRIPTION OF THE DRAWINGS

FIG. 8 is a vertical cross-section of the casting member taken along the line VIII-VIII of FIG. 7;

FIG. 9 is a longitudinal side view of the casting member showing the longitudinal side visible in FIG. 3;

FIG. 10 is a perspective view showing the flange member for attaching the heat exchanger core to the casting member;

DETAILED DESCRIPTION OF PREFERRED EMBODIMENTS

Figure 1:
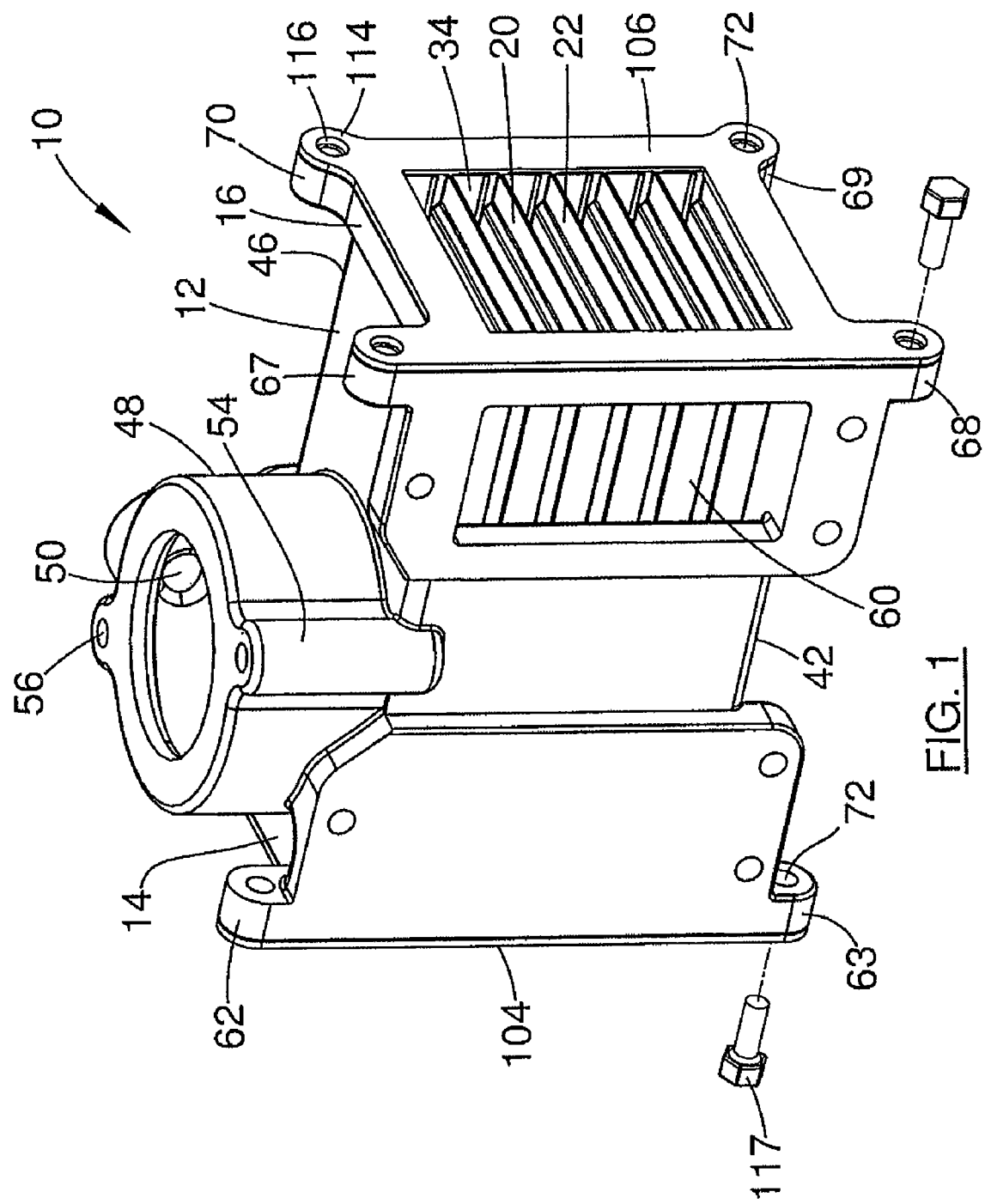
FIG. 1 is a perspective view of a heat exchanger constructed in accordance with the present disclosure, this view being taken from above and showing two vertical sides of the heat exchanger.
Figure 2:
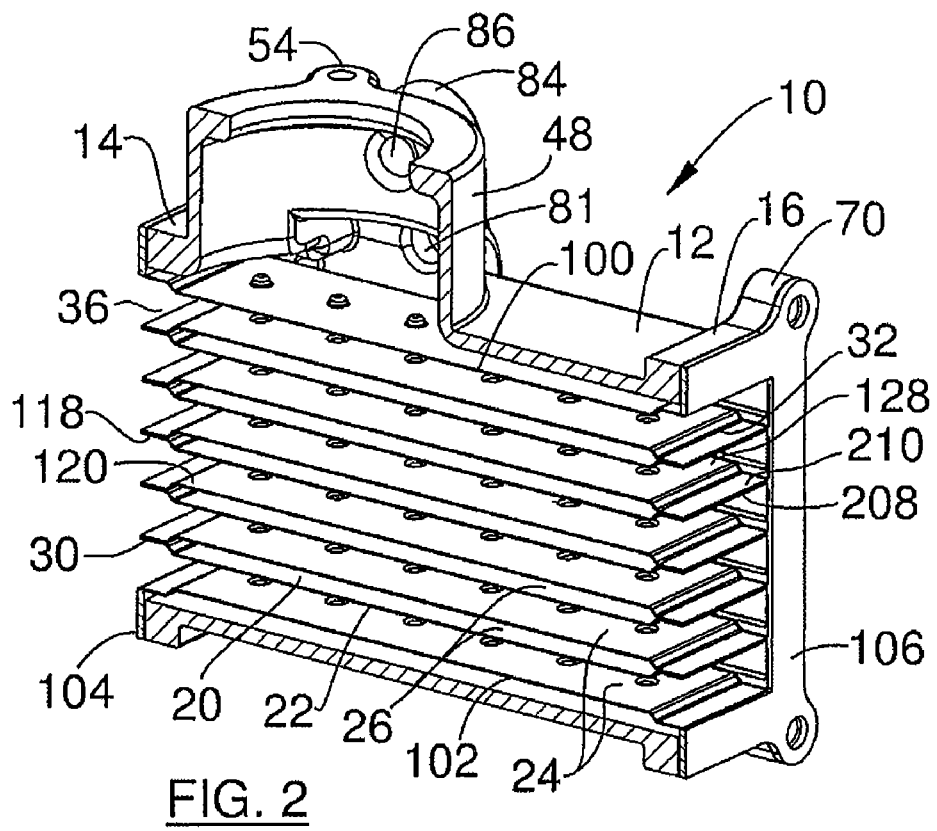
FIG. 2 is a perspective, cross-sectional view of the heat exchanger of FIG. 1, this view being taken along a central, longitudinal, vertical plane.
Figure 3:
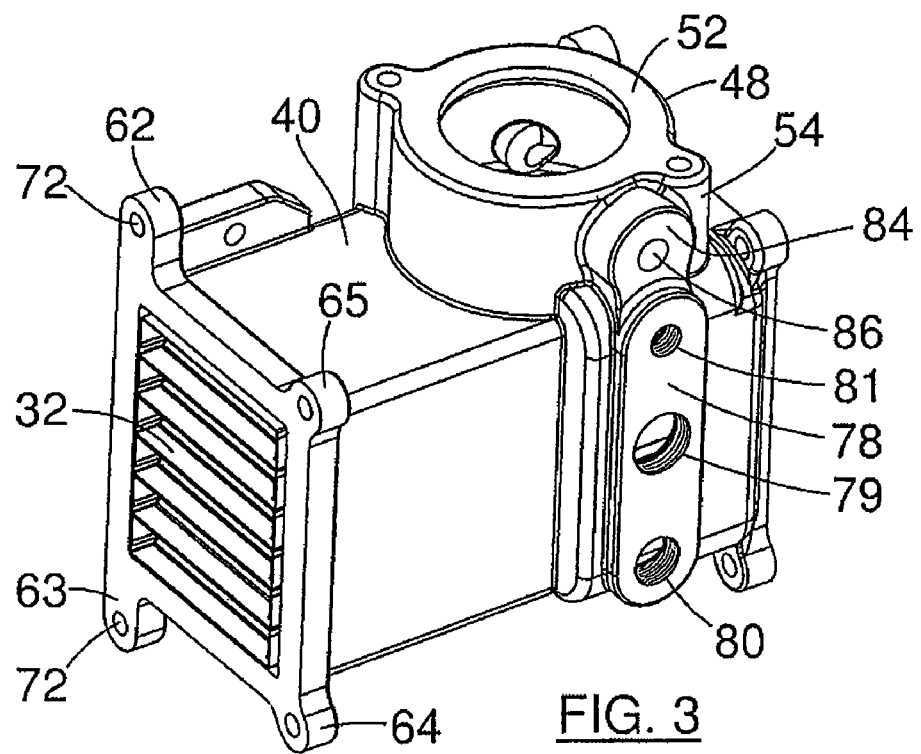
FIG. 3 is a perspective view of the outer casting member of the heat exchanger of FIG. 1 with a heat exchanger core arranged therein, this view being taken from the above and showing a longitudinal side opposite to the longitudinal side shown in FIG. 1.
Figure 4:
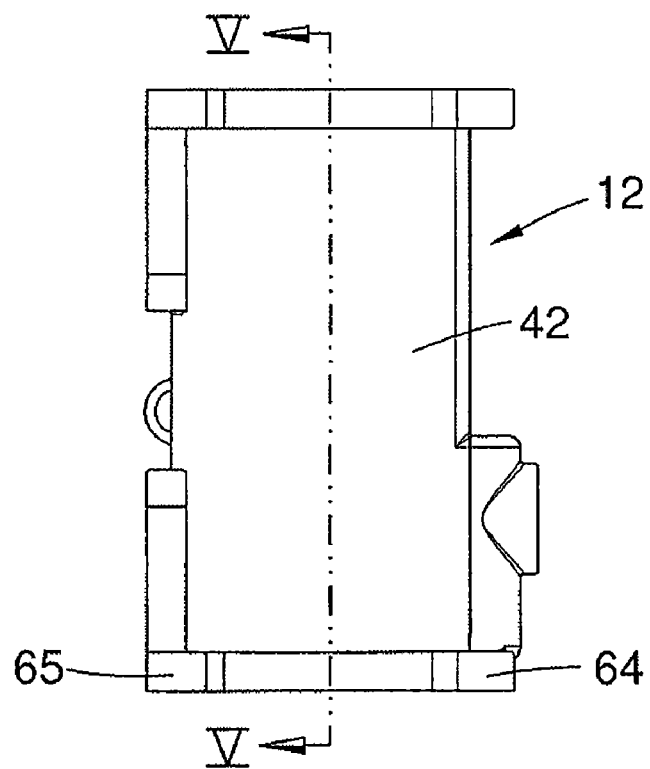
FIG. 4 is a bottom view of the casting member of FIG. 3.
Figure 16:
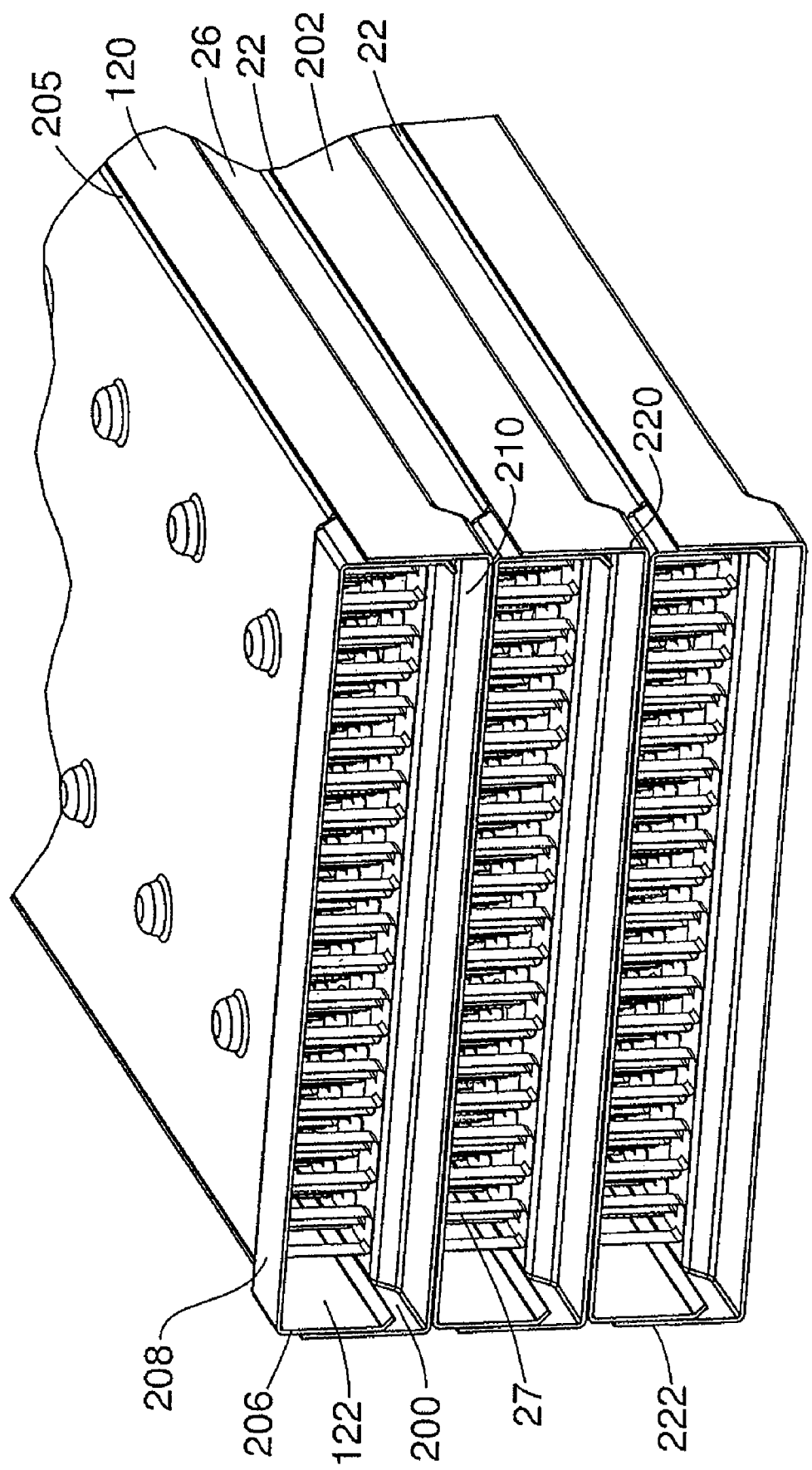
FIG. 16 is an isometric detail view of end sections of three stacked channel members for flow of exhaust gas.

A heat exchanger 10 capable of cooling exhaust gases of a vehicle by means of a fluid, such as a coolant, is illustrated in FIGS. 1 and 2. This embodiment of a heat exchanger includes an outer casting member 12 having a first end 14 and a second end 16 and forming a heat exchanger housing extending between the first and second ends. The casting member 12 can be a relatively low cost water casting which, in an exemplary embodiment is made of grey cast iron. Located within the box-like chamber of the casting member is a heat exchanger core 20 which can comprise a plurality of stacked channel members 22 defining a first set of flow channels 24 therethrough for the flow of a first fluid through the heat exchanger. In an exemplary embodiment the flow channels contain corrugated fin structures which are not shown in FIG. 2 but which are illustrated in FIG. 16. If the heat exchanger 10 is being used as an exhaust gas recirculation (EGR) cooler, this first fluid is a hot exhaust gas such as that produced by a vehicle engine. A second set of flow channels 26 is formed between the channel members for the flow of a second fluid through the heat exchanger. In the case of an EGR cooler, this second fluid can be standard liquid coolant of the type commonly used in vehicles to cool working components such as the vehicle engine. The core 20 has a first end 30 and a second and opposite end 32. The first and second ends of the core 20 extend beyond the first and second ends of the casting member 12 for at least a short distance as indicated in FIG. 3.

The illustrated casting member 12 is open at its first and second ends 14 and 16, these ends defining rectangular inlet and outlet ports as shown for the passage of exhaust gas into and out of the heat exchanger. The port 34 can be an inlet for the exhaust gas while the port 36 can be an outlet for the flow of the exhaust gas. However, flow of the exhaust gas in the opposite direction is also possible so that the port 34 becomes the outlet. For purposes of this description only, and based on the orientation of the heat exchanger as shown in FIGS. 1 and 2, the casting member has a top wall 40, a flat bottom wall 42 and two longitudinal side walls 44 and 46. The top 40 is formed with a cylindrical extension 48 having a circular coolant outlet 50 formed at its outer end. An annular flange 52 extends about this outlet and two lugs 54 are formed on opposite sides of the extension. Each lug is formed with a bolt receiving hole 56 and bolts (not shown) can be used to attach a coolant pipe to the outer end of the extension 48.

There is located in one of the longitudinally extending sidewalls a further rectangular opening 60. This opening provides a coolant inlet port for coolant to flow into the spaces or gaps formed between the channel members 22.

Formed at each of the ends 14, 16 of the casting member are projecting, connecting lugs, each with a bolt-receiving threaded hole for connecting flanges to attach the heat exchanger core as described hereinafter. The first end 14 has four corner lugs 62 to 65. The second end 16 also has four corner lugs 67 to 70 with the bolt holes 72. An elongate, vertically extending protuberance 78 can be provided to provide a side passageway for the flow of coolant to the outlet 50. As illustrated this protuberance is formed with three circular threaded openings 79 to 81 which are aligned vertically and which are optionally provided for mounting pressure and temperature sensors (not shown). The sensors can be screwed into these openings. The flat surface surrounding the openings is machined to be very flat to allow the sensors to be properly mounted. A smaller protuberance 84 extends from one side of the extension 48 and has a hole 86 extending therethrough. The optional hole 86 can also be used to mount a pressure or temperature sensor.

Figure 5:
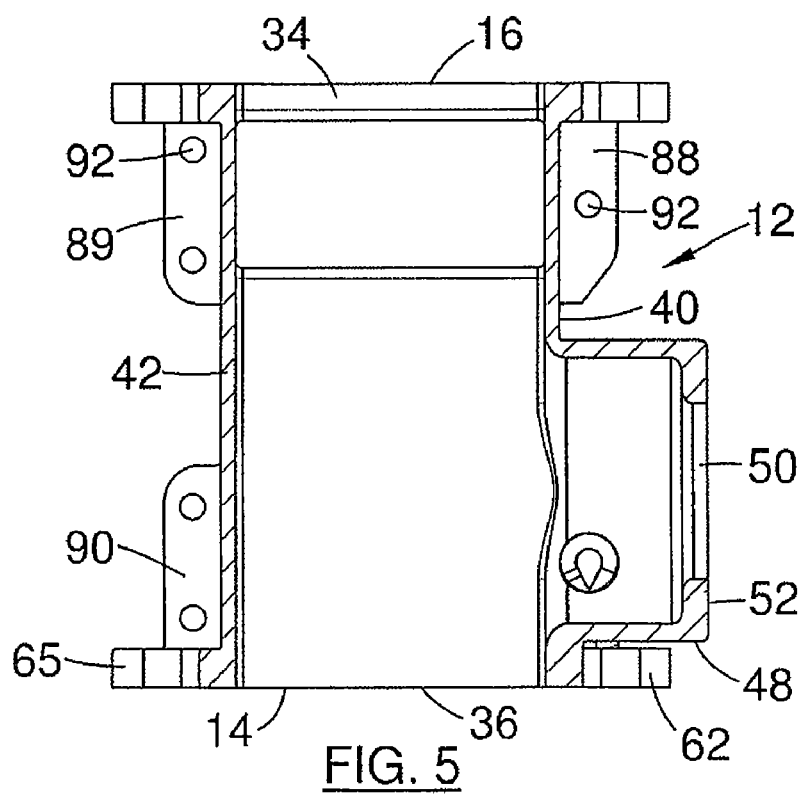
FIG. 5 is a cross-sectional view taken along the line V-V of FIG. 4.
Figure 6:
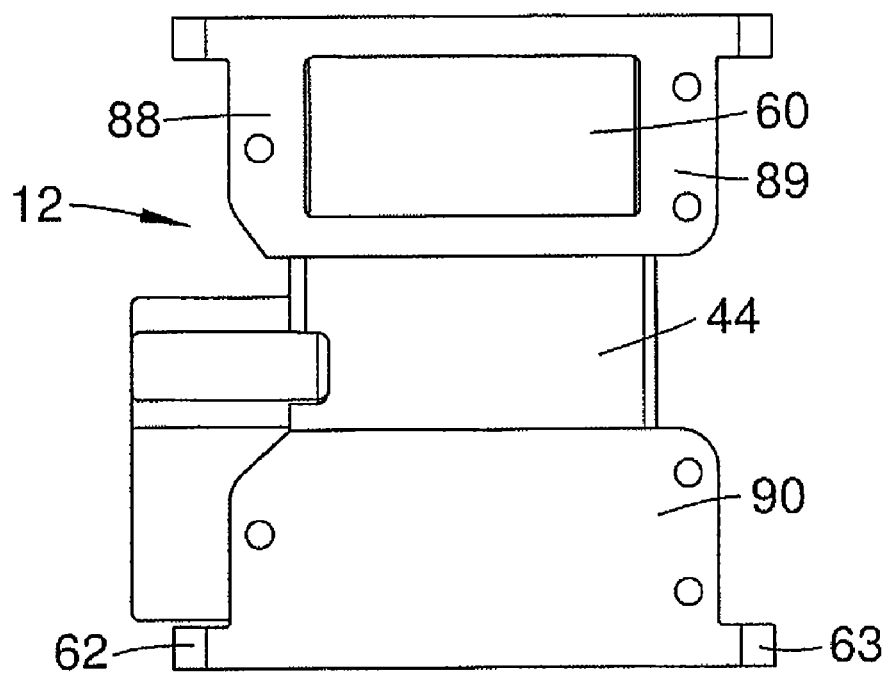
FIG. 6 is a longitudinal side view of the casting member of FIG. 3.
Figure 7:
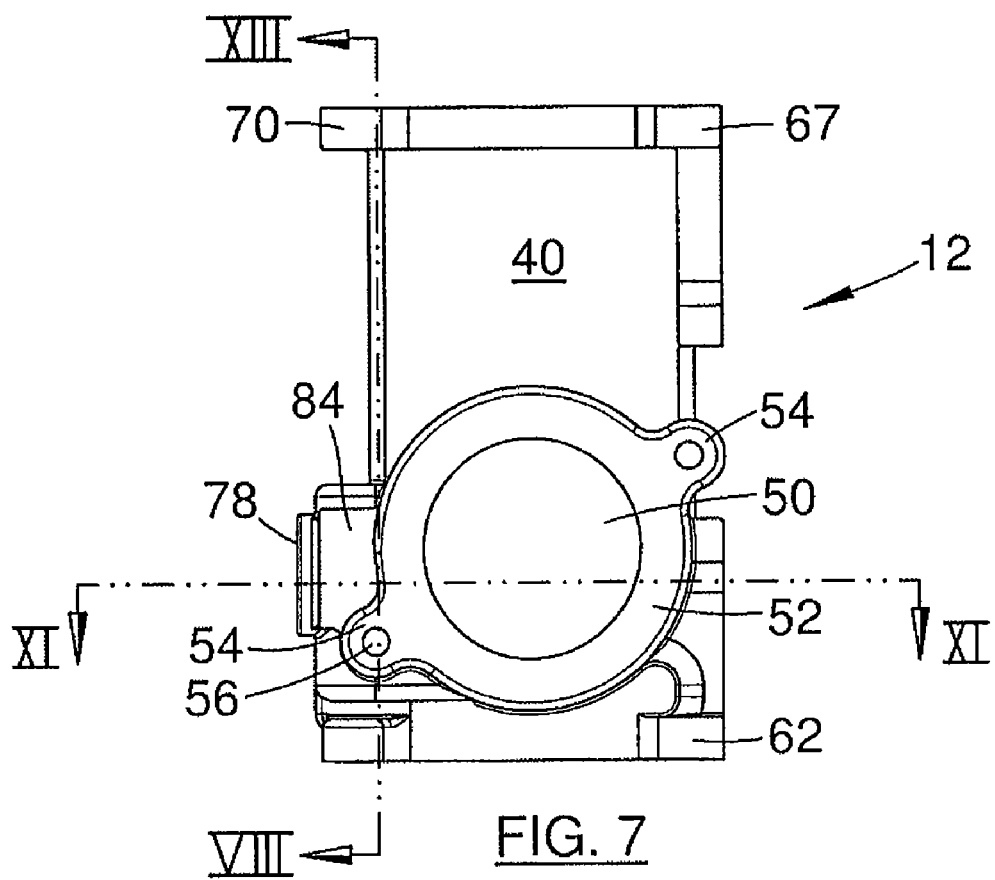
FIG. 7 is a top view of the casting member of FIG. 3.
Figure 11:
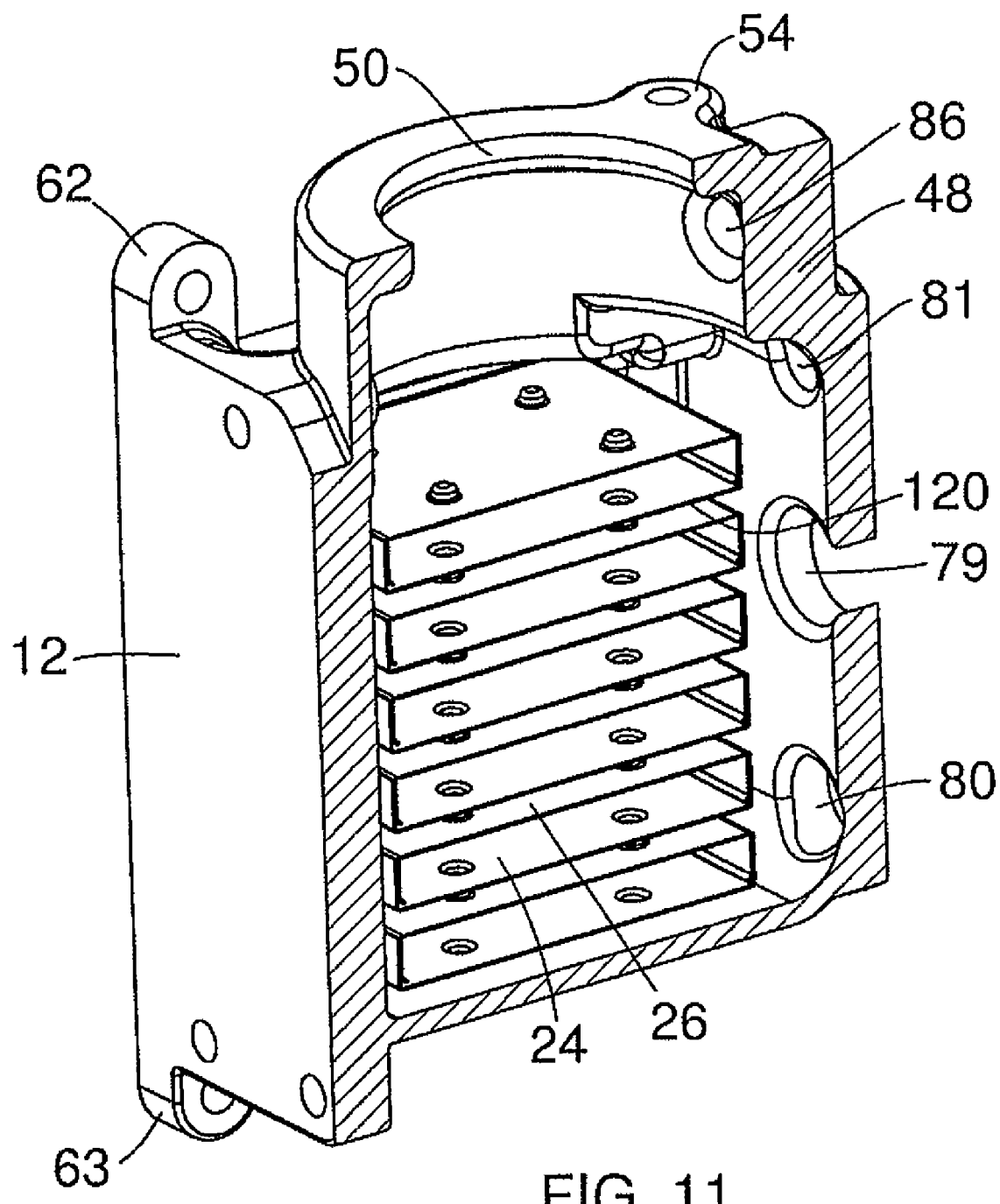
FIG. 11 is a perspective view of part of the heat exchanger of FIGS. 1 and 2 providing a cross-section taken along the line XI-XI of FIG. 7.
Figure 12:
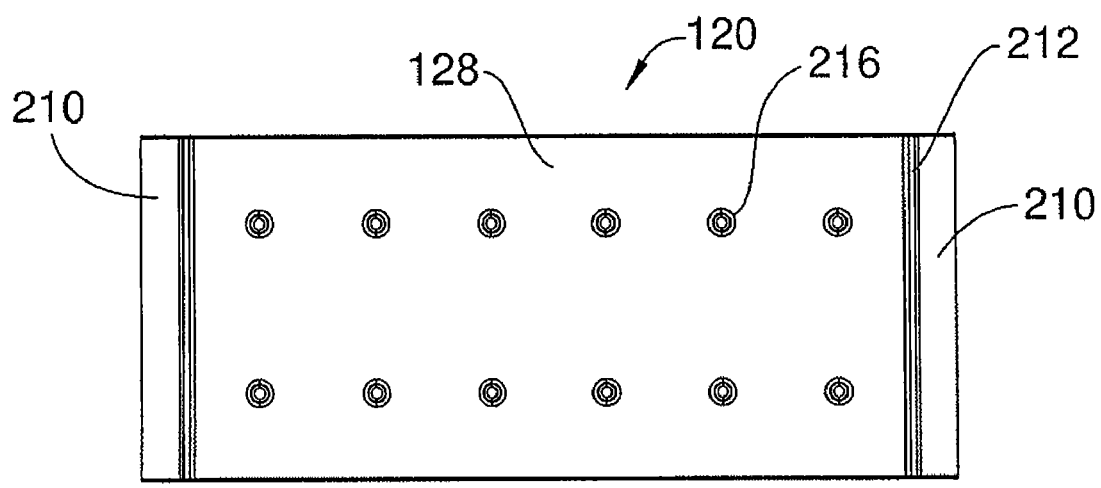
FIG. 12 is a plan view of an outer plate for forming one side of a channel member for flow of exhaust gas.
Figure 13:
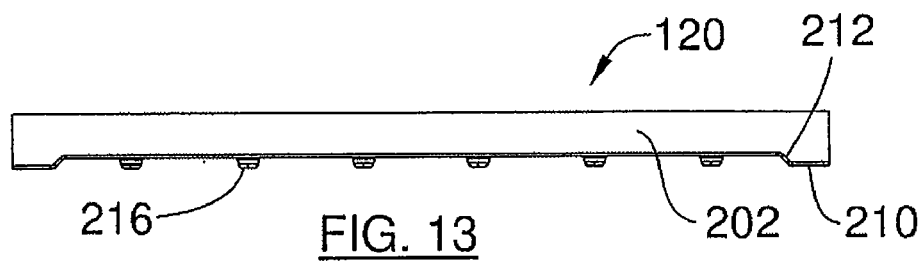
FIG. 13 is an edge view of the outer plate of FIG. 12.
Figure 14:
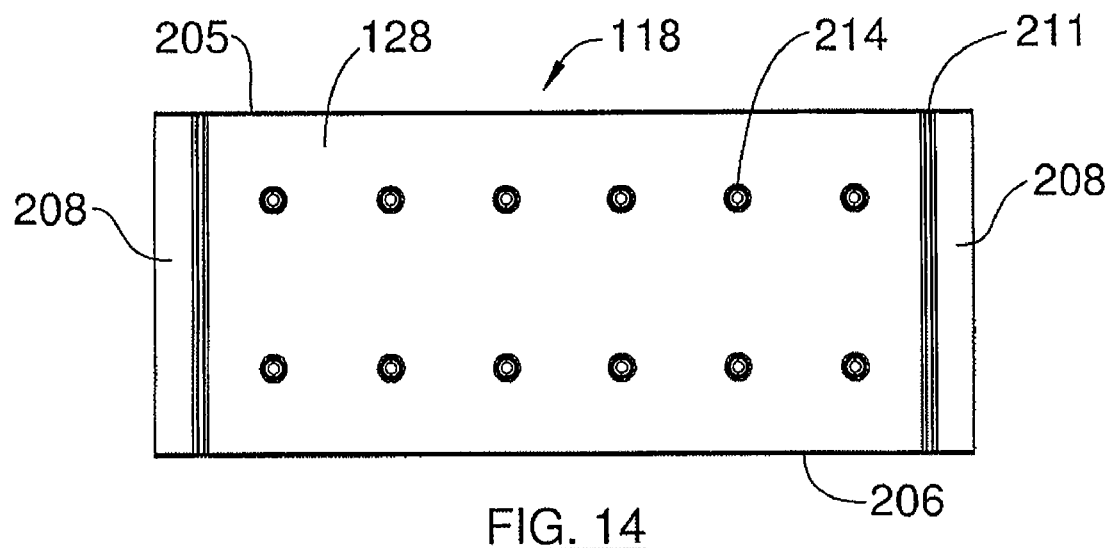
FIG. 14 is plan view of an inner plate for forming an opposite side of the channel member for flow of exhaust gas.
Figure 15:
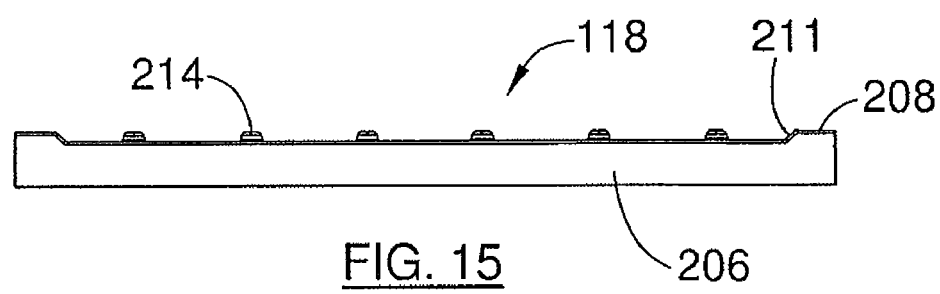
FIG. 15 is an edge view of the inner plate of FIG. 14.

Additional connecting flanges can be provided on the casting member at 88 to 90 (see FIG. 5), each provided with fastener holes 92. These flanges can be used, if required, for mounting the casting member to adjacent supports or frames.

The heat exchanger core 20 can take a variety of forms. The illustrated, exemplary core comprises a stack of heat exchanger channel members 22 and the core can include a top plate 100 which is one-half of the top channel member 22 and a bottom plate 102 which is one half of the bottom channel member. The top and bottom plates 100, 102 are connected at their opposite ends to a first flange 104 and a second flange 106 by welding forming a continuous sealed joint along the edge of each plate. The two flanges are of similar shape and the first flange 104 is shown separately in FIG. 10. Each flange forms a rectangular opening 108 for the flow of exhaust gas therethrough. Each flange can be in the form of a rectangular frame which, as shown, has four sides 109 to 112 and connecting tabs 114 are provided at each of the four corners. Each of these tabs has a bolt receiving hole 116. Two of the tabs on one side can be longer than the tabs on the opposite side of the flange as shown in FIGS. 1 and 10. The two flanges can be connected to the casting member 12 by suitable bolts, two of which are shown in FIG. 1. Nuts can be used to connect these bolts if the lugs on the casting member are not threaded. It will thus be appreciated that the first flange 104 is adapted to be coupled to the first end 14 of the casting member 12 while the second flange 106 is adapted to be coupled to the second end 16 of the casting member. The first and second flanges can be used to provide a seal between the heat exchanger core and the casting member 12 when the flanges are coupled thereto.

Each of the illustrated channel members 22 can be formed by a pair of plates 118, 120. Each of these plates is formed with edge flanges 208, 210 at opposite ends thereof and adjacent edge flanges of two plates of adjacent channel members are sealingly connected such as by a brazing process. In fact, a single brazing step can be used to form the entire core of the heat exchanger. Each plate has a relatively large, central section 128 which is spaced apart from the central section of the other plate of the pair so as to form a respective one of the flow channels 24.

FIGS. 12 to 15 illustrates details of the inner plate 118 and outer plate 120 which together can form each channel member 22. The outer plate 120 has two longitudinally extending edge flanges 200 and 202 with both of these edge flanges being visible in FIG. 16. Similarly, each of the inner plates 118 has two longitudinal edge flanges 205, 206. As shown in FIG. 16, the edge flanges 205, 206 of the inner plate are overlapped by the edge flanges 200 and 202 of the outer plate and they can be fixedly and sealingly connected together by a brazing process which is a process well known in the heat exchanger industry. One of the plates, for example, the outer plate, can be initially coated with a brazing material to facilitate the brazing process. In an exemplary version of the heat exchanger the plates 118, 120 are constructed of thin metal plates having a thickness in the range of 0.2 to 0.6 mm (or 0.008" to 0.025").

End flanges 208 and 210 are formed at opposite ends of the plates 118, 120 as shown and these extend the full width of each plate. A sloping transition section 211, 212 can be formed between each plates central section 128 and the end flange. In the case of the illustrated inner plate 118, the end flanges 208 are displaced a short distance upwardly from the plane of the adjacent central section. In the case of the outer plate 120 as shown in FIG. 16, the end flanges 210 are displaced a short distance downwardly from the plane of its central section 128. The end flanges 208, 210 permit each channel member to be fixedly brazed to the adjacent channel member at their respective opposite ends. Also, each of the inner and outer plates can be formed with rows, for example, two rows of dimples 214, 216. In the case of the inner plate 118, the dimples, which can be provided with flat tops, project upwardly so that their tops are in the same plane as the end flanges 208. On the other hand, the dimples 216 on the outer plate 120 project downwardly when the outer plate is oriented in the manner shown in FIGS. 13 and 16. The dimples can be used to rigidly connect adjacent channel members in the region of their central sections 128 and the dimples can also help maintain the space or gap between the adjacent central sections of two channel members. In particular, adjacent dimples of adjacent channel members can be connected by the brazing process.

Although the corrugated fin structure 27 can be constructed with standard corrugations extending the length of or a substantial portion of the length of the core, in a preferred embodiment, each fin structure comprises rows of adjacent corrugations wherein the corrugations of one row are offset from the corrugations of the next row to provide enhanced heat transfer in a manner known in the heat exchanger industry.

As can be best seen in FIG. 16, the stacked channel members 22 at each end of the core form two substantially continuous vertical edges at 220, 222. Moreover, these vertical edges extend the full height of the opening formed in the adjacent first flange 104 or the adjacent second flange 106. Thus, the complete perimeter of the core at each end can be welded in a continuous manner to the adjacent end flange 104 or 106. In this way, a sealed joint is formed between the first end flange 104 and the adjacent end of the core and between the second flange and the end of the core adjacent thereto.

Figure 17:
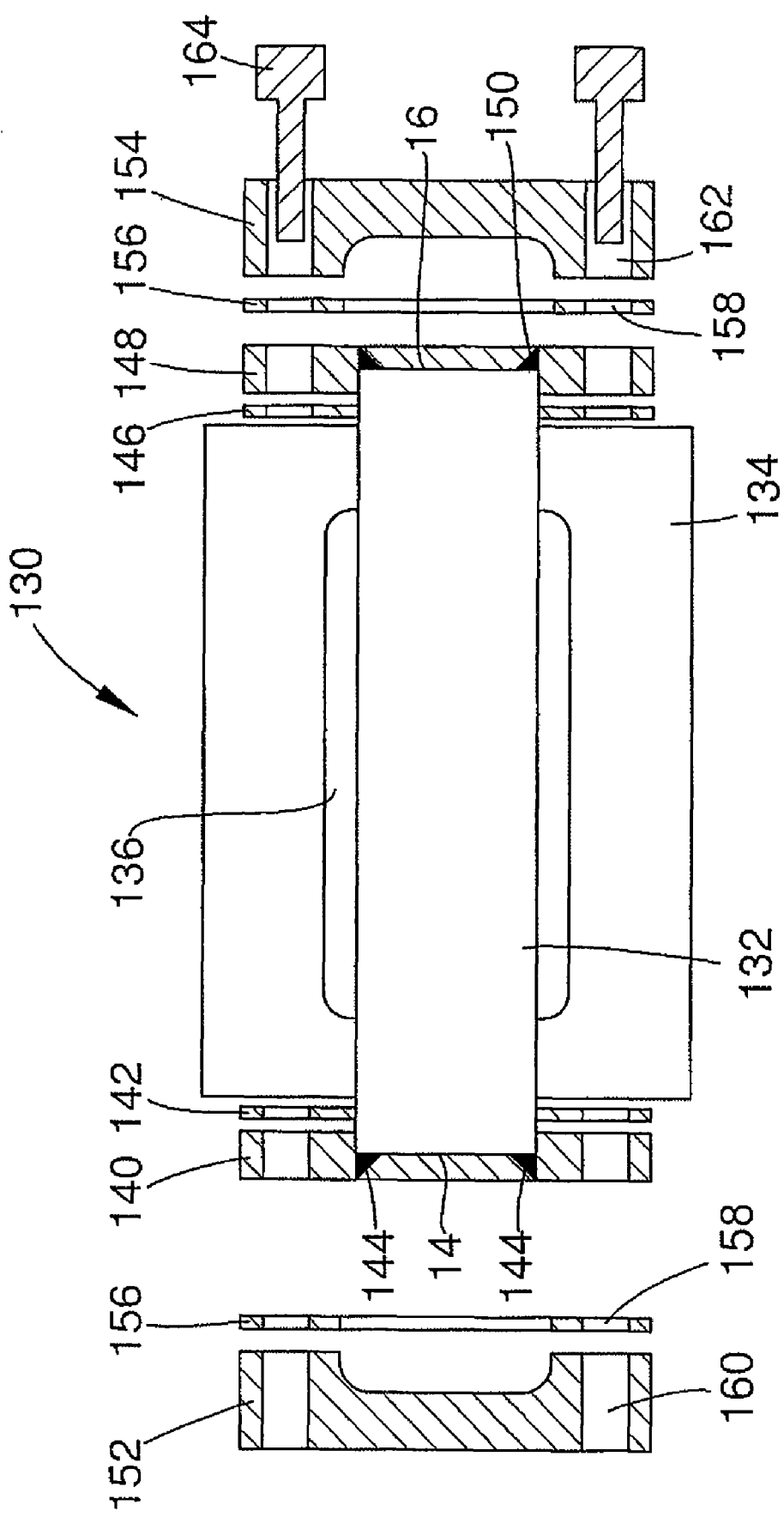
FIG. 17 is a schematic, longitudinal cross-sectional view of another embodiment of a heat exchanger according to the present disclosure.

FIG. 17 illustrates schematically another embodiment of a heat exchanger which can be used as an EGR cooler. This heat exchanger 130 is comprised of a heat exchanger core 132 which can also be made up of a plurality of stacked channel members similar to those used in the embodiment of FIGS. 1 and 2. These channel members also define a first set of flow channels extending longitudinally therethrough and a second set of flow channels. In an exemplary embodiment of the core, these channel members are brazed together to form a unitary core.

An outer casting in the form of casting member 134 surrounds the core 132 and allows for a coolant, such as a glycol/water mixture, to flow through the second set of flow channels formed between the channel members. As in the first embodiment, the coolant serves to cool the exhaust gas which flows through the first set of flow channels.

In order to mount the core 132 in the casting so that the core is located in a chamber 136 formed by the casting, an end flange 140 and a gasket or seal 142 is positioned on the first end 14 of the core with the end flange being welded into place as indicated by welds 144 which extend in a continuous sealing manner along all four edges of the first end 14. After the welding operation, the core with the gasket mounted thereon can be inserted through one end of the casting 134. After this step, the end flange 140 with adjacent gasket 142 abut the end of the casting and form a seal around the opening in the end thereof so as to prevent any leaking of the coolant through the end of the heat exchanger or EGR cooler 130.

The next step in the method of making this heat exchanger is to mount a second gasket or seal 146 and a second flange member 148 on the second, exposed end 16 of the core. According to an exemplary form of the manufacturing method, the assembly is compressed and held together with fixtures and the second end flange 148 is welded into position on its end of the core, two welds being indicated at 150. The second gasket or seal 146 forms a seal on its respective open end of the casting member 134, thereby preventing any leaks from this end of the heat exchanger. At this stage in the assembly, the core is mounted within the casting member and the heat exchanger is a complete unit.

In this heat exchanger, there are also provided EGR inlet casting 152 and an EGR outlet casting 154, each formed with a rectangular opening (not shown) for the flow of exhaust gases therethrough. These two castings can also be considered end caps for the heat exchanger. Positioned on the inside surface of each of these castings is an additional gasket or seal 156, each formed with bolt holes 158. The inlet and outlet castings themselves are also formed with bolt holes 160, 162 for the passage of bolts 164, only two of which are shown. It will be understood that the castings 152, 154 provide means for attaching the heat exchanger within the exhaust gas circuit of the vehicle. The joints between each casting 152, 154 and its respective flange member is sealed by its respective gasket 158.

Although not shown in FIG. 17, it will be understood that the casting member 134 is provided with an inlet for the inflow of coolant into its chamber 136 and an outlet for this coolant.

When welding the second flange member 148 to its end of the core, one must take care not to damage the adjacent gasket 146. Depending on the material used for the gasket 146, it may be required to cool down the flange member during the welding operation.

Figure 18:
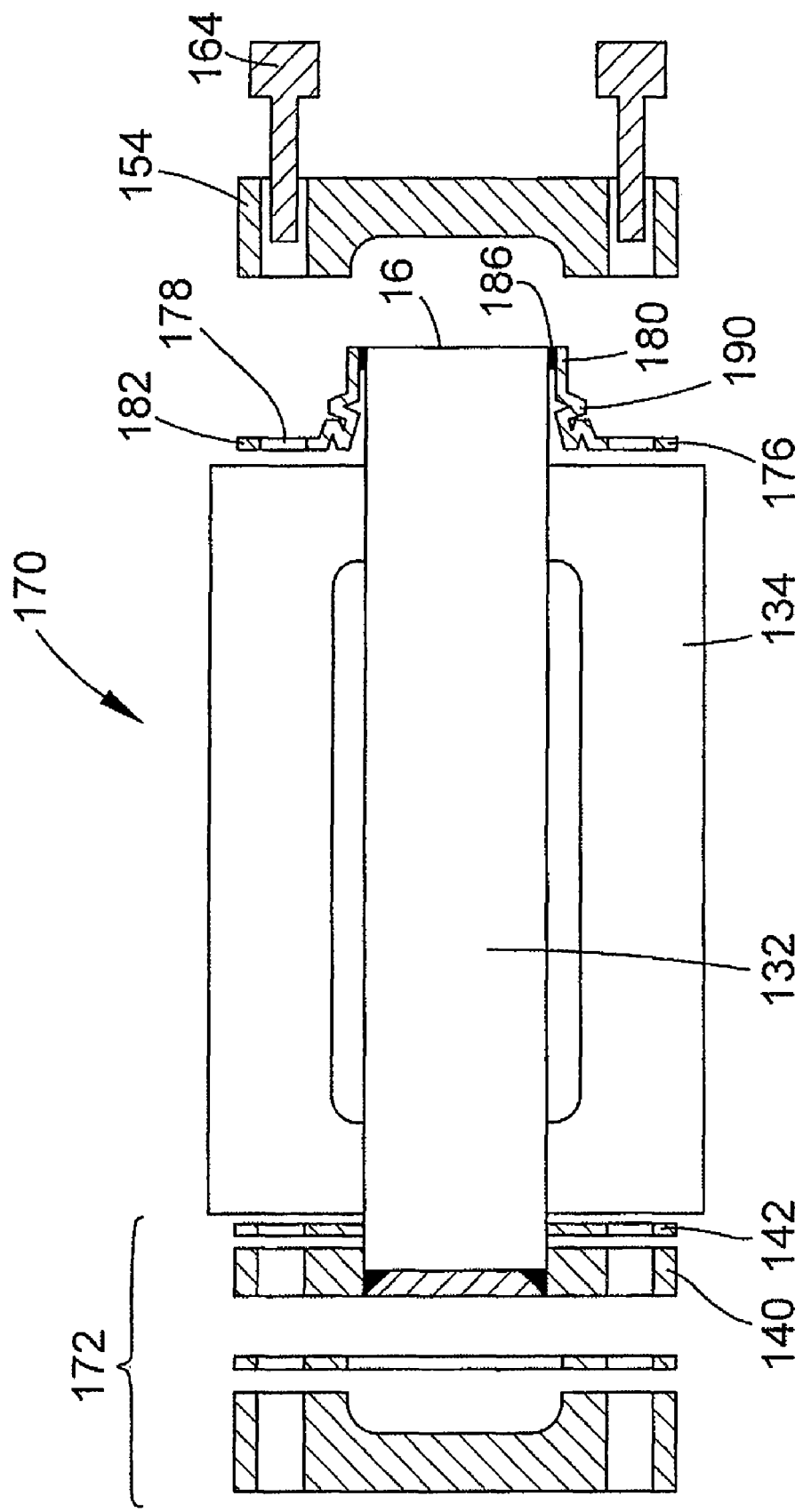
FIG. 18 is another schematic cross-section of a further embodiment of a heat exchanger constructed in accordance with the present disclosure.

A further embodiment of a heat exchanger 170 that can be used as an EGR cooler is illustrated in FIG. 18 schematically. Only those parts and components of this heat exchanger which differ from the heat exchanger 130 of FIG. 17 will be described herein. The end section indicated generally at 172 is constructed the same as the corresponding end section of the embodiment of FIG. 17. However, in place of the second end flange member 148 and a separate gasket 146, this embodiment has a flexible end flange member 176 provided with bolt holes 178. The end flange 176 is used to secure and seal the heat exchanger core at its respective end to the casting member. The flexible flange member 176 can also be considered a flexible seal having a tubular, radially inner section 180 which is welded to the projecting second end 16 of the cooler core. This flexible seal also has a planar, radially outer section 182 in which the bolt holes 178 are formed. This outer section 182 is adapted to be detachably connected by means of the bolts 164 to the second end of the casting member which can also be termed a cooler housing. The flexible flange member 176 has a corrugated central portion 190 which allows for a degree of longitudinal expansion of the core which can occur due to the varying temperature ranges to which the heat exchanger is exposed during operation. At the same time, this central portion is able to maintain with the rest of the flange member a seal between the core and the casting member. The inner section 180 conforms to the shape of the exposed end portion of the core. The outer section 182 overlaps the adjacent end of the casting member. It will be understood that this other end is bolted in place when the outlet casting end cap 154 is positioned on the end of the casting member and secured with the bolts 164.

A distinct advantage of the heat exchanger described herein is that it can be made with a relatively inexpensive outer casting member which does not require welding in order to attach the heat exchanger core to the casting. In one embodiment of the heat exchanger, mounting flanges at opposite ends of the core are attached to the outer casting by means of bolts. With the heat exchanger constructed in the manner illustrated in FIG. 18, there can be additional advantages such as the ability of the heat exchanger to compensate for differences in thermal expansion between the core and the outer housing and the use of less components over all.

Additional advantages of exemplary heat exchangers constructed as described herein include the possible use of a wider variety of materials for the core (and/or casting) since compatibility between the material used for the core and the material used for the casting may not be required because they are not welded together. Also, at least in the case of the embodiment illustrated in FIG. 18 which uses a flexible second flange to mount the core, the use of such a flange allows for the expansion of the core in a way that helps prevent cracks or leaks at the joints between the core and the casting.

While the present invention has been illustrated and described as embodied in several exemplary embodiments, ie., embodiments having particular utility in heat exchange or cooling applications, it is to be understood that the present invention is not limited to the details shown herein, since it will be understood that various omissions, modifications, substitutions and changes in the forms and details of the disclosed heat exchangers and methods of making same may be made by those skilled in the art without departing in any way from the spirit or scope of the present invention. For example, those of ordinary skill in the art will readily adapt the present disclosure for various other applications without departing from the spirit and scope of the present invention.

We claim:

1. A heat exchanger comprising:
    an outer casting member having a first end and a second end and forming a heat exchanger housing extending between said first and second ends;
    a plurality of stacked channel members defining respectively a first set of flow channels for the flow of a first fluid through said heat exchanger, spaces formed between adjacent channel members so as to provide a second set of flow channels for the flow of a second fluid through said heat exchanger, said stacked channel members forming a heat exchanger core having a first end and a second end, said heat exchanger core being mounted within said outer casting member;
    a first flange fixedly attached to the first end of said heat exchanger core so as to provide a sealed joint between the first flange and said first end;
    a second flange fixedly attached to the second end of said heat exchanger core so as to provide a sealed joint between the second flange and the second end,
    wherein each of said first and second flanges are adapted to be coupled by fasteners to its respective end of the outer casting member.

2. A heat exchanger according to claim 1 including a first seal arranged between said first flange and said first end of said outer casting member and a second seal arranged between said second flange and the second end of said outer casting member.

3. A heat exchanger according to claim 1, wherein said fasteners include bolts, said outer casting member is made of cast iron, and is formed with bolt receiving holes at both said first end and said second end, and said first and second flanges are formed with bolt holes aligned with said bolt-receiving holes in the outer casting member in order that said flanges can be attached by the bolts to said outer casting member.

4. A heat exchanger according to claim 3 including:
    an inlet casting forming an inlet for exhaust gases from an engine, and
    an outlet casting forming an outlet for said exhaust gases, both said inlet and outlet castings having additional bolt holes formed therein which are alignable with said bolt-receiving holes in said outer casting member and said bolt holes in said first and second flanges,
    wherein some of said bolts can be used to attach said inlet casting and said first flange together to said first end of said outer casting member and further of said bolts can be used to attach said outlet casting and said second flange to said second end of said outer casting member.

5. A heat exchanger according to claim 3, wherein said stacked channel members are constructed of thin plates having a thickness in the range of 0.2 to 0.6 mm.

6. A heat exchanger according to claim 3, wherein said first fluid is an exhaust gas from an engine, said second fluid is a coolant for cooling exhaust gas, and each channel member contains a corrugated fin plate to enhance heat exchange between the first and second fluids.

7. A heat exchanger according to claim 1, wherein said second flange is a flexible gasket having a tubular inner section fixedly attached to said second end of said heat exchanger core and an outer section adapted to be coupled by said fasteners to said second end of said outer casting, said flexible gasket permitting thermal expansion of said heat exchanger core relative to said outer casting member during operation of said heat exchanger.

8. A heat exchanger according to claim 7, wherein said outer section of the gasket and said first flange are formed with bolt holes and said outer casting member is formed with bolt-receiving holes at both said first end and second end, wherein said flexible gasket and said first flange can be attached by bolts to said outer casting member.

9. A heat exchanger according to claim 8 including:
an inlet casting forming an inlet for exhaust gases from an engine, and
an outlet casting forming an outlet for said exhaust gases,
both said inlet and said outlet castings having additional bolt holes formed therein which are aligned with said bolt-receiving holes in said outer casting member and said bolt holes in said outer section of the gasket and said first flange,
wherein some of said bolts can be used to attach said inlet casting member and said first flange member together to said first end of said outer casting and further of said bolts can be used to attach said outlet casting and said gasket to said second end of said outer casting member.

10. A heat exchanger according to claim 9 including:
a first seal arranged between said first flange and said first end of said outer casting member, and
a second seal arranged between said inlet casting and said first flange.

11. An exhaust gas cooler for use in a vehicle having an engine that in use emits an exhaust gas, said cooler comprising:
a cast cooler housing having a first end, an opposite second end, a heat exchange chamber extending between said first and second ends, an inlet port for coolant, and an outlet port for coolant;
a heat exchanger core having a first end and a second end and mounted in said chamber of the cooler housing, said core including channel members defining first flow channels for the flow of said exhaust gas through the core, second flow channels being provided between the channel members for flow of said coolant through the core, said second flow channels alternating with said first flow channels;
a first flange fixedly attached to the first end of said heat exchanger core so as to provide a sealed joint between the first flange and said first end;
a second flange fixedly attached to the second end of said heat exchanger core so as to provide a sealed joint between the second flange and the second end,
wherein each of said first and second flanges are adapted to be coupled by fasteners to its respective end of the outer casting member.

12. An exhaust gas cooler according to claim 11, wherein said fasteners are bolts, said cooler housing is made of cast iron and is formed with bolt-receiving holes at both its first and second ends, and said first and second flanges are both formed with bolt holes alignable with said bolt-receiving holes in said cooler housing in order that said flanges can be connected by said bolts to said cooler housing.

13. An exhaust gas cooler according to claim 12 wherein corrugated fin plates are mounted in said first flow channels to enhance heat exchange between the exhaust gas and the coolant.

14. An exhaust gas cooler according to claim 12 including a first seal arranged between said first flange and said first end of the cooler housing and a second seal arranged between said second flange and said second end of the cooler housing.

15. An exhaust gas cooler according to claim 14, wherein said second flange is a flexible gasket having a tubular inner section fixedly attached to said second end of said heat exchanger core and an outer section adapted to be connected to said second end of said cooler housing by some of said bolts.

16. A method of making a heat exchanger, comprising:
providing a brazed cooler core having a first and second end, said core including channel members arranged one above another and defining two sets of flow channels for the flow of coolant through a first of said sets and the flow of hot gases through a second of said sets, the flow channels of the first set alternating with the flow channels of the second set;
providing a cast cooler housing having a first end, an opposite second end, a heat exchange chamber extending between said first and second ends, and ports for flow of said coolant into and out of the chamber;
welding a first flange member on said first end of the cooler core so as to provide a sealed joint between the first flange member and said first end;
inserting said cooler core into said heat exchange chamber of the cooler housing through a first opening in said first end of the cooler housing so that said first flange member is adjacent said first end of the cooler housing and an end section of the cooler core projects through a second opening in said second end of the cooler housing; and
welding a second flange member to said second end of the cooler core so that a sealed joint is provided between the second flange member and the said second end.

17. A method according to claim 16 including the additional steps of:
placing a first seal adjacent an inner surface of said first flange member after the latter is welded on said first end so that after said cooler core insertion step, said first seal is arranged between said first flange member and said first end of the cooler housing.

18. A method according to claim 17 including the further step of:
placing a second seal adjacent said second end of the cooler housing prior to welding said second flange member to said second end of the cooler core, and
compressing the assembly of said cooler core with the attached first flange member, the cooler housing, and said first and second seals together prior to said step of welding the second flange member.

19. A method according to claim 17, wherein said second flange member is a flexible seal having a tubular radially inner section which is welded to said second end of the cooler core and a planar, radially outer section adapted to be connected to said second end of said cooler housing by means of bolts, said second flange member during use of the heat exchanger allowing said cooler core to thermally expand in a lengthwise direction of the cooler core.

20. A method according to claim 19 including the additional step of detachably connecting an outlet casting to said radially outer section of the second flange member and to said second end of the cooler, said outlet casting having a central outlet opening aligned with said second end of said cooler core.

* * * * *